United States Patent [19]

Mishra et al.

[11] Patent Number: 5,552,491
[45] Date of Patent: Sep. 3, 1996

[54] STAR-BRANCHED ACRYLATE AND METHACRYLATE POLYMERS

[75] Inventors: Munmaya K. Mishra; Shailaja M. Shirodkar, both of Wappinger Falls; Alfred K. Jung, Millwood, all of N.Y.

[73] Assignee: Ethyl Additives Corporation, Richmond, Va.

[21] Appl. No.: 456,195

[22] Filed: May 31, 1995

Related U.S. Application Data

[62] Division of Ser. No. 378,977, Jan. 27, 1995.

[51] Int. Cl.$^6$ .......................... C08F 265/06; C08F 267/02; C08F 297/02
[52] U.S. Cl. .......................... 525/299; 525/301; 525/302; 525/305
[58] Field of Search ...................... 525/299, 301, 525/302, 305

[56] References Cited

PUBLICATIONS

Tsitsilianis, C. et al, Core–First Synthesis of Star Polymers with Potentially Iouogenic Branches, Macromolecules, 22, v. 24, Oct. 91, pp. 5897–5902.

*Primary Examiner*—Irina Zemel
*Attorney, Agent, or Firm*—Dennis H. Rainear

[57] ABSTRACT

A star-branched polymer comprising a core portion and polymeric arms. The core portion is obtained by anionic polymerization of at least one unsaturated acrylate or methacrylate ester of a polyol and the polymeric arms are obtained by anionic polymerization of at least one acrylic or methacrylic monomer.

46 Claims, No Drawings

STAR-BRANCHED ACRYLATE AND METHACRYLATE POLYMERS

This is a divisional of co-pending application Ser. No. 08/378,977 filed Jan. 27, 1995.

FIELD OF THE INVENTION

The present invention relates to star-branched polymers derived from acrylic or methacrylic monomers. Additionally, the invention relates to the use of these star-branched polymers as lubricating oil additives.

BACKGROUND OF THE INVENTION

The preparation of star-branched polymers comprising a nucleus joining polymeric arms of non-hydrogenated and hydrogenated homopolymers or copolymers of conjugated dienes or selectively hydrogenated copolymers of conjugated dienes and mono-alkenyl arenes is known. The nucleus of these polymers comprises a poly (polyvinyl aromatic) coupling agent such as poly(divinylbenzene) and can have 4 to 30 polymeric arms. The polymeric arms are polybutadiene or polyisoprene arms.

Multifunctional anionic initiators (Eschwey et al., Makromol. Chem. 173 (1973) 235 and Burchard et al., Polymer 16 (1975) 180) have been used as well as controlled amounts of bis-unsaturated monomers, usually divinyl benzene (Worsfold et al., Can. J. Chem., 47 (1969) 3379, Young et al., Macromolecules, 11 (1978) 899, Martin et al., Anionic Polymerization: ACS Symp. Ser., 166 (1981) 557). Most of the work in the area of star-branched polymers has been conducted using polystyrenes or polydienes. Relatively little work has been done with polymethacrylate star-branched polymers. Rather polydisperse materials which increased in viscosity and molecular weight on storage were prepared using group transfer polymerization (Simms et al., Rubber Chem. Technol. 64 (1991) 139). Zhu et al., Macromolecules, 25 (1992) 7330, Tsitsilianis et al., Macromolecules, 24 (1991), 5897 and Zilliox et al., J. Polym. Sci., Part C, 22 (1968) 148 have published reports in which star polymers from methacrylate were prepared.

There is, however, a present need for the preparation of star-branched polymers from acrylic or methacrylic monomers which have molecular weights and other physical characteristics which make them commercially useful in various applications including usefulness as lubricating oil additives.

SUMMARY OF THE INVENTION

The present invention relates to star-branched polymers utilizing anionic polymerization in which the polymeric arms are derived from acrylic or methacrylic monomers and the nucleus or core is derived from unsaturated acrylate or methacrylate esters of polyols such as di-, tri- or tetra acrylates or methacrylates. Additionally, the present invention relates to lubricating oils containing a lubricating oil additive comprising a star-branched polymer derived from an acrylic or methacrylic monomer as prepared in accordance with the instant invention.

DETAILED DESCRIPTION OF THE INVENTION

The present invention relates to the preparation of star-branched polymers of acrylate and methacrylate monomers optionally with vinyl comonomers using anionic polymerization. Acrylic and methacrylic monomers which are useful in the present invention for the preparation of the arms of the star-branched polymers include acrylic acid, acrylic acid esters, acrylonitriles, acrylamides, methacrylic acid, methacrylic acid esters, methacrylonitriles, and methacrylamide. The preferred acrylic and methacrylic monomers are alkyl acrylates or alkyl methacrylates wherein the alkyl group contains from 1 to 18 carbon atoms. The alkyl radical can be either unsubstituted or substituted. Examples of such acrylates and methacrylates include methylacrylate, methyl methacrylate, ethyl acrylate, ethyl methacrylate, butyl acrylate, butylmethacrylate, isobutyl acrylate, isobutyl methacrylate, tert-butyl acrylate, tert-butyl methacrylate, propyl methacrylate, 2-ethylhexyl acrylate, 2-ethylhexyl methacrylate, hexyl acrylate, hexyl methacrylate, isopropyl methacrylate, lauryl acrylate, lauryl methacrylate, stearyl acrylate and stearyl methacrylate.

Vinyl comonomers include, for example, butadiene, isoprene, styrene, alpha methyl styrene, vinyl toluene, t-butyl styrene, chlorostyrene, vinylnaphthalene, 2-vinylpyridine, 4-vinylpyridine and the like.

Initiators useful in the present invention include initiators of the formula:

R—M in which M is an alkali metal or an alkaline earth metal and R is a straight-chain or branched alkyl or cyclo-alkyl preferably having from 1 to 6 carbon atoms or an aryl. Examples of such initiators include, for example, hydrocarbyllithium initiators such as alkyllithium compounds, preferably methyl lithium, n-butyllithium, sec-butyllithium, cycloalkyllithium compounds, preferably, cyclohexyllithium and aryllithium compounds, preferably, phenyllithium, 1-methylstyryllithium, p-tolyllithium, naphyllithium and 1,1-diphenyl-3-methylpentyllithium. Also useful initiators include, naphthalene sodium, 1,4-disodio-1,1.4,4-tetraphenylbutane, diphenylmethylpotassium and diphenylmethylsodium. Tertiary alcoholates of lithium and compounds containing trimethylsilyl groups may also be employed.

The core of the present star-branched polymers are prepared from unsaturated acrylate or methacrylate esters of polyols.

Typical such esters include, for example, ethyleneglycol diacrylate, diethylene glycol diacrylate, glycerol diacrylate, glyceryl triacrylate, mannitol hexaacrylate, 4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates and methacrylates of polyethylene glycols of molecular weight 200–4000, and alpha, omega-polycaprolactonediol diacrylate; pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate and dimethacrylate.

The process used to prepare the instant star-branched polymer is preferably carried out in the absence of moisture and oxygen and in the presence of at least one inert solvent. Preferably, the polymerization of the core and arms is conducted in the absence of any impurity which is detrimental to an anionic catalyst systems. The inert solvent is preferably a hydrocarbon, an aromatic solvent or an ether. Suitable solvents include isobutane, pentane, cyclohexane, benzene, toluene, xylene, tetrahydrofuran, diglyme, tetraglyme, orthoterphenyl, biphenyl, decalin or tetralin.

The polymerization or copolymerization temperature useful in the preparation of the present star-branched polymers varies between about 0° C. and about −78° C.

The present star-branched polymers are preferably prepared in an anionic polymerication system which preferably employs 1,1-diphenylethylene in the initiator system for the anionic polymerization. 1,1-diphenylethylene has relatively high electro-affinity and does not homopolymerize.

If desired the arms of the instant star-branched polymers can be prepared in a manner such that the number average molecular weight of the homopolymers or copolymers including block copolymers comprising the arms is from about 500 to about 1,000,000.

The arms are prepared by an anionic polymerization or copolymerization of the acrylic or methacrylic monomers wherein the monomers and comonomers are added to the anionic polymerication reaction medium either at once or in very fast continuous manner.

The present star-branched polymers are useful as additives, preferably viscosity index improver additives, in an oil of lubricating viscosity. It is a feature of the present invention that the instant star-branched polymers can be used as lubricating oil viscosity index improvers when present in an effective amount of about 0.1 wt % to about 30 wt %, preferably from about 1 wt % to about 10 wt %, most preferably about 2 wt %. Lubricating oils in which the instant star-branched polymers may find use may be synthetic and mineral oils including automotive, aircraft, marine, railway, etc., oils; oils used in spark ignition or compression ignition, summer or winter oils, etc. Typically, the lubricating oils may be characterized by a b.p. of about 570° F. to about 660° F., preferably about 610° F., an e.p. of about 750° F. to about 1200° F., preferably 1020° F.; an API gravity of about 25 to about 31, preferably about 29.

Addition of the present star-branched polymer additives to a lubricating oil may be facilitated by use of a concentrate containing about 1 to about 50 wt %, preferably 5 to about 20 wt % of the star-branched polymer additives in a synthetic or mineral oil.

The present star-branched polymers may be prepared by a core or nucleus-first method or a core-or nucleus-last method. In the core-first method an acrylate or methacrylate ester of a polyol is anionically polymerized in an anionic polymerization medium and the polymeric arms of the star are formed by addition of the acrylic or methacrylic monomer and optionally the vinyl comonomer to the anionic polymerization reaction mixture containing the preformed core. In the core-last method, the polymeric arms are produced first by polymerization of the acrylic or methacrylic monomer and optionally the vinyl comonomer in an anionic polymerization reaction medium. After preparation of the polymeric arms, the acrylate or methacrylate ester of a polyol is added to the anionic polymerization reaction medium containing the preformed polymeric arms and the reaction proceeds to the formation of the star-branched polymer.

If desired the polymeric arms can be prepared in a manner such that the polymeric arms have a narrow number average molecular weight range and a narrow polydispersity index within a range of about 1.00 to about 2.0, preferably about 1.0 to about 1.5. This can be achieved by adding the monomers and comonomers which make up the polymeric arms to the anionic polymerization reaction medium either at once or in very fast continuous manner. More specifically, the adding of the monomers to be polymerized or copolymerized to the initiation system is carried out either at once or in a rapid continuous manner.

In the preparation of the instant star-branched polymers, the polymerization is generally carried out in an inert atmosphere, for example under a nitrogen, argon, etc. atmosphere. Equipment used in the polymerization reaction should be carefully dried such as by drying at about 150° C. for several hours. Solvents and reagents are also carefully dried. As an example if tetrahydrofuran (THF) is used as the polymerization medium, the THF can be freshly distilled over sodium-benzophenone (from a characteristic purple color). Acrylic or methacrylic or other monomers or comonomers can be purified by passing the monomer or comonomer through neutral or basic alumina. Diphenyl ethylene (DPE) can be dried over molecular sieve. The metallic initiators are normally used as received.

It is important in achieving the desired polydispersity for the polymeric arms that the monomers and comonomers be added to the polymerization reactor in a particular manner. Addition to the reactor containing reaction medium and initiator should be conducted in a rapid manner. Either the monomers and/or comonomers are added in one-shot (at once) as a single amount or rapidly added as a continuous stream. Dropwise addition can be used. The reaction is quite fast and is normally complete within a few seconds. Conversion is also quite good in the instant process and is generally approximately 100 conversion.

The following examples are provided as being illustrative and are not intended to be in any way limiting on the scope of the present invention.

The specific embodiments of the invention as given in the examples are illustrative and not limiting. The artisan can easily determine various improvements or modifications which will fall within the scope of the present invention. Specific reaction conditions and reaction parameters for any specific monomer or comonomer can be determined with either no experimentation or with a not undue amount of experimentation.

EXAMPLES

Experimental Procedure

In the following examples, polymerizations were carried out in resin kettles under nitrogen atmosphere. The resin kettles were equipped with mechanical stirrers and polymerizations were carried out in THF. Lauryl methacrylate (LMA) monomer was purified by passing through neutral or basic alumina. Diphenylethylene (DPE) was dried over molecular sieve.

The sequence of addition/preparation for the polymerizations in the examples was as follows:

1. The required amount of distilled THF was charged to a dry resin kettle;

2. The THF was degassed by nitrogen for about 5 to 10 minutes with stirring;

3. The required amount of DPE was charged to the resin kettle;

4. The polymerization system was titrated with sec. butyllithium to a red endpoint (process for cleaning the impurities);

5. The required amount of sec. butyllithium was charged (solution became deep red);

6. LMA monomer was added at once (very fast); and the core forming monomer, i.e. ethylene glycol dimethacrylate (EGDMA) or trimethylolpropanetrimethacrylate (TMPTMA) was quickly added;

7. The prepared polymer was recovered and the molecular weights and distributions were determined by Gel Permeation Chromatograph (GPC) using polystyrene and/or polymethylmethacrylate calibration.

In the case of the core first method of preparing the instant star-branched polymers, in step 7, the core forming monomer, i.e. EGDMA or TMPTMA were first quickly added to the polymerization system followed by addition of LMA monomer at once (very fast) to the polymerization system containing the preformed core.

EXAMPLES 1 TO 7

Examples 1 to 7 were conducted in the manner discussed hereinabove at a reaction temperature of about −30° C. The relevant data for the illustrative embodiments of the CORE-FIRST method are shown in the following table:

| SYNTHESIS OF STAR-BRANCHED POLYMERS VIA CORE-FIRST METHOD | | | | | | | |
|---|---|---|---|---|---|---|---|
| Exam I | DPE mole | s-Buli mole | LMA mole | TMPTMA mole | ARM Mn | Star/Mn g/mole | Star/Mw | Mw/Mn |
| 1 | 0.005 | 0.00195 | 0.17 | 0.00059 | 25K | 136,800 | 249,900 | 1.83 |
| 2 | 0.005 | 0.00195 | 0.17 | 0.00147 | 25K | 464,500 | | 7.4 |
| 3 | 0.0025 | 0.00087 | 0.17 | 0.00047 | 50 | 191,700 | 470,600 | 2.4 |
| 4 | 0.0025 | 0.00097 | 0.17 | 0.00047 | 50 | 228,900 | 436,400 | 1.9 |
| 5 | 0.0025 | 0.00097 | 0.17 | 0.00047 | 50K | 315,700 | 797,000 | 2.5 |
| 6 | 0.0025 | 0.00097 | 0.17 | 0.00047 | 50K | 658,500 | 3,013,00 | 4.5 |
| 7 | 0.00125 | 0.00049 | 0.17 | 0.00029 | 100K | 276,900 | 645,000 | 2.3 |

Examples 8 to 11 were conducted in the manner discussed hereinabove at a reaction temperature of about −30° C. The relevant data for the illustrative embodiments of the CORE-LAST method are shown in the following Table:

| SYNTHESIS OF STAR-BRANCHED POLYMETHACRYLATES VIA CORE-LAST METHOD | | | | | | | | | |
|---|---|---|---|---|---|---|---|---|---|
| Exam II | DPE mole | s-Buli mole | LMA mole | EGDMA mole | TMPTMA mole | ARM Mn | Star/Mn g/mole | Star/Mw | Mw/Mn |
| 8 | 0.0025 | 0.000975 | 0.17 | 0.0050 | | 44,000 | 100,300 | 351,050 | 3.5 |
| 9 | 0.0025 | 0.000975 | 0.17 | 0.0020 | | 44,000 | 68,600 | 400,800 | 5.8 |
| 10 | 0.0025 | 0.000975 | 0.17 | | 0.0027 | 44,000 | 86,750 | 226,100 | 2.6 |
| 11 | 0.0025 | 0.000975 | 0.17 | | 0.0059 | 44,000 | 139,050 | 858,250 | 6.1 |

We claim:

1. A concentrate for addition to a lubricating oil comprising a minor amount of a star-branched polymer comprising a core portion and polymeric arms wherein said core portion is obtained by anionic polymerization of at least one unsaturated acrylate or methacrylate ester of a polyol and said polymeric arms are obtained by anionic polymerization of at least one acrylic or methacrylic monomer and a major amount of a synthetic oil or mineral oil.

2. The concentrate according to claim 1, wherein the acrylic or methacrylic monomer is acrylic acid, acrylic acid esters, acrylonitriles, acrylamides, methacrylic acid, methacrylic acid esters, methacrylonitriles, or methacrylamide.

3. The concentrate according to claim 1, wherein the polymeric arms further include a vinyl monomer copolymerized with the acrylic or methacrylic monomer.

4. The concentrate according to claim 1, wherein the acrylic or methacrylic monomers are alkyl acrylates or alkyl methacrylates wherein the alkyl group contains from 1 to 18 carbon atoms.

5. The concentrate according to claim 4, wherein the acrylates and methacrylates are methylacrylate, methyl methacrylate, ethyl acrylate, ethyl methacrylate, butyl acrylate, butylmethacrylate, isobutyl acrylate, isobutyl methacrylate, tert-butyl acrylate, tert-butyl methacrylate, propyl methacrylate, 2-ethylhexyl acrylate, 2-ethylhexyl methacrylate, hexyl acrylate, hexyl methacrylate, isopropyl methacrylate, lauryl acrylate, lauryl methacrylate, stearyl acrylate or stearyl methacrylate.

6. The concentrate according to claim 3, wherein the vinyl comonomers are butadiene, isoprene, styrene, alpha methyl styrene, vinyl toluene, t-butyl styrene, chlorostyrene, vinylnaphthalene, 2-vinylpyridine, or 4-vinylpyridine.

7. The concentrate according to claim 1, wherein the unsaturated ester is ethyleneglycol diacrylate, diethylene glycol diacrylate, glycerol diacrylate, glyceryl triacrylate, mannitol hexaacrylate, 4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates or methacrylates of polyethylene glycols of molecular weight 200–4000, or alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate or dimethacrylate.

8. A star-branched polymer according to claim 4, wherein the unsaturated ester is ethyleneglycol diacrylate, diethylene glycol diacrylate, glycerol diacrylate, glyceryl triacrylate, mannitol hexaacrylate, 4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates or methacrylates of polyethylene glycols of molecular weight 200–4000, or alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate or dimethacrylate.

9. The concentrate according to claim 8, wherein the unsaturated ester is ethylene glycol dimethacrylate or trimethylolpropane trimethacrylate.

10. A star-branched polymer according to claim 1, wherein the anionic polymerization is carried out in an inert solvent in the presence of a polymerization initiator medium containing an initiator having the formula

R—M in which M is an alkali metal or an alkaline earth metal and R is a straight-chain or branched alkyl or cyclo-alkyl or an aryl or diphenylethylene.

11. The concentrate according to claim 10, wherein the acrylic or methacrylic monomer is added to the polymerization initiator medium as a single one-shot dosage.

12. The concentrate according to claim 10, wherein the acrylic or methacrylic monomer is added in a rapid continuous manner to the polymerization initiator medium.

13. The concentrate according to claim 10, wherein the polymerization is carried out in an inert atmosphere.

14. The concentrate according to claim 10, wherein the reaction medium is a aliphatic or aromatic hydrocarbon or an ether.

15. A star-branched polymer according to claim 14, wherein the reaction medium is isobutane, pentane, cyclohexane, benzene, toluene, xylene, tetrahydrofuran, diglyme, tetraglyme, orthoterphenyl, biphenyl, decalin or tetralin.

16. A star-branched polymer according to claim 1, wherein the polymeric arms have a polydispersity of from about 1.0 to about 2.0.

17. A star-branched polymer according to claim 10, wherein the polymerization reaction is carried out at a temperature of between about 30° C. and about −78° C.

18. A star-branched polymer according to claim 10, wherein the initiator is a hydrocarbyllithium compound.

19. A star-branched polymer according to claim 18, wherein the hydrocarbyl lithium compound is an alkyllithium compound, a cycloalkyllithium compound or an aryllithium compound.

20. A star-branched polymer according to claim 1, wherein the number average molecular weight of the polymeric arms is from about 500 to about 1,000,000.

21. A star-branched polymer according to claim 1, wherein the polymeric arms are prepared first by anionic polymerization in an anionic polymerization medium and the acrylate or methacrylate ester is then added to the anionic polymerization medium to form the core and the star-branched polymer.

22. A star-branched polymer according to claim 1, wherein the core is prepared first by anionic polymerization of the acrylate or methacrylate ester in an anionic polymerization medium and the acrylic or methacrylic monomer is then added to the anionic polymerization medium to form the polymeric arms and the star-branched polymer.

23. The concentrate according to claim 10, wherein the alkyl or cyclo-alkyl have from 1 to 6 carbon atoms.

24. A lubricating oil composition comprising a lubricating oil and a viscosity improver effective amount of a star-branched polymer comprising a core portion and polymeric arms wherein said core portion is obtained by anionic polymerization of at least one unsaturated acrylate or methacrylate ester of a polyol and said polymeric arms are obtained by anionic polymerization of at least one acrylic or methacrylic monomer.

25. The lubricating oil composition according to claim 24, wherein the acrylic or methacrylic monomer is acrylic acid, acrylic acid esters, acrylonitriles, acrylamides, methacrylic acid, methacrylic acid esters, methacrylonitriles, or methacrylamide.

26. The lubricating oil composition according to claim 24, wherein the polymeric arms further include monomers copolymerized vinyl with the acrylic or methacrylic monomer.

27. The lubricating oil composition according to claim 24, wherein the acrylic or methacrylic monomers are alkyl acrylates or alkyl methacrylates wherein the alkyl group contains from 1 to 18 carbon atoms.

28. The lubricating oil composition according to claim 27, wherein the acrylates and methacrylates are methylacrylate, methyl methacrylate, ethyl acrylate, ethyl methacrylate, butyl acrylate, butylmethacrylate, isobutyl acrylate, isobutyl methacrylate, tert-butyl acrylate, tert-butyl methacrylate, propyl methacrylate, 2-ethylhexyl acrylate, 2-ethylhexyl methacrylate, hexyl acrylate, hexyl methacrylate, isopropyl methacrylate, lauryl acrylate, lauryl methacrylate, stearyl acrylate or stearyl methacrylate.

29. The lubricating oil composition according to claim 26, wherein the vinyl comonomers are butadiene, isoprene, styrene, alpha methyl styrene, vinyl toluene, t-butyl styrene, chlorostyrene, vinylnaphthalene, 2-vinylpyridine, or 4-vinylpyridine.

30. The lubricating oil composition according to claim 24, wherein the unsaturated ester is ethyleneglycol diacrylate, diethylene glycol diacrylate, glycerol diacrylate, glyceryl triacrylate, mannitol hexaacrylate, 4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates or methacrylates of polyethylene glycols of molecular weight 200–4000, or alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate or dimethacrylate.

31. The lubricating oil composition according to claim 27, wherein the unsaturated ester is ethyleneglycol diacrylate, diethylene glycol diacrylate, glycerol diacrylate, glyceryl triacrylate, mannitol hexaacrylate, 4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates or methacrylates of polyethylene glycols of molecular weight 200–4000, or alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate or dimethacrylate.

32. The lubricating oil composition according to claim 31, wherein the unsaturated ester is ethylene glycol dimethacrylate or trimethylolpropane trimethacrylate.

33. The lubricating oil composition according to claim 24, wherein the anionic polymerization is carried out in an inert solvent in the presence of a polymerization initiator medium containing an initiator having the formula

R—M in which M is an alkali metal or an alkaline earth metal and R is a straight-chain or branched alkyl or cyclo-alkyl or an aryl or diphenylethylene.

34. The lubricating oil composition according to claim 33, wherein the acrylic or methacrylic monomer is added to the polymerization initiator medium as a single one-shot dosage.

35. The lubricating oil composition according to claim 33, wherein the acrylic or methacrylic monomer is added in a rapid continuous manner to the polymerization initiator medium.

36. The lubricating oil composition according to claim 33, wherein the polymerization is carried out in an inert atmosphere.

37. The lubricating oil composition according to claim 33, wherein the reaction medium is a aliphatic or aromatic hydrocarbon solvent or an ether.

38. The lubricating oil composition according to claim 37, wherein the reaction medium is isobutane, pentane, cyclohexane, benzene, toluene, xylene, tetrahydrofuran, diglyme, tetraglyme, orthoterphenyl, biphenyl, decalin or tetralin.

39. The lubricating oil composition according to claim 24, wherein the polymeric arms have a polydispersity of from about 1.0 to about 2.0.

40. The lubricating oil composition according to claim 33, wherein the polymerization reaction is carried out at a temperature of between about 30° C. and about −78° C.

41. The lubricating oil composition according to claim 33, wherein the initiator is a hydrocarbyllithium compound.

42. The lubricating oil composition according to claim 41, wherein the hydrocarbyl lithium compound is an alkyllithium compound, a cycloalkyllithium compound or an aryllithium compound.

43. The lubricating oil composition according to claim 24, wherein the number average molecular weight of the polymeric arms is from about 500 to about 1,000,000.

44. The lubricating oil composition according to claim 24, wherein the polymeric arms are prepared first by anionic polymerization in an anionic polymerization medium and the acrylate or methacrylate ester is then added to the anionic polymerization medium to form the core and the star-branched polymer.

45. The lubricating oil composition according to claim 24, wherein the cure is prepared first by anionic polymerization of the acrylate or methacrylate ester in an anionic polymerization medium and the acrylic or methacrylic monomer is then added to the anionic polymerization medium to form the polymeric arms and the star-branched polymer.

46. The lubricating oil composition according to claim 33, wherein the alkyl or cyclo-alkyl have from 1 to 6 carbon atoms.

* * * * *

UNITED STATES PATENT AND TRADEMARK OFFICE
CERTIFICATE OF CORRECTION

PATENT NO. : 5,552,491
DATED : September 3, 1996
INVENTOR(S) : Munmaya K. Mishra et al.

It is certified that error appears in the above-indentified patent and that said Letters Patent is hereby corrected as shown below:

In Column 4, line 22, change "can" to "cannot".

Signed and Sealed this

Twenty-sixth Day of November 1996

Attest:

BRUCE LEHMAN

Attesting Officer     Commissioner of Patents and Trademarks